July 27, 1948.  E. LABIN  2,445,783

TRANSMISSION SYSTEM

Filed July 24, 1944  2 Sheets-Sheet 1

INVENTOR.
EMILE LABIN
BY
ATTORNEY

July 27, 1948.  E. LABIN  2,445,783
TRANSMISSION SYSTEM
Filed July 24, 1944  2 Sheets-Sheet 2

INVENTOR.
EMILE LABIN
BY Percy P. Lantzy
ATTORNEY

Patented July 27, 1948

2,445,783

UNITED STATES PATENT OFFICE 2,445,783

TRANSMISSION SYSTEM

Emile Labin, New York, N. Y., assignor to Federal Telephone and Radio Corporation, New York, N. Y., a corporation of Delaware Application July 24, 1944, Serial No. 546,378

4 Claims. (Cl. 179—171.5)

This invention relates to modulators and more particularly to circuits for time modulating a train of pulses.

An object of the invention is to provide modulator means for varying the time positions of the pulses of a train in accordance with the instantaneous values of a signal wave.

The basic feature of the invention is the employment of a retardation circuit preferably a passive network of the inductance-capacitance type. The train of pulses to be time modulated is applied to the retardation circuit and electrical signal energy is used for varying the retardation characteristics of the circuit. This variation of the retardation characteristics may be performed in several different ways. One example is to use an inductance coil or coils having iron cores, the permeability of which is easily varied. The signals may be applied directly to the coil or coils of the network circuit by placing them in the anode circuit of the signal amplifier, or if the signals are sufficiently strong they may be applied by magnetic coupling through the use of a transformer, one of the coils of which is a coil of the retardation network circuit.

According to another example, the retardation characteristics of the delay network may be varied by using a condenser microphone as one of the condensers of the circuit.

It will be understood that the time displacement of the pulses according to audio or other signals will be small. Small time displacements, however, are of advantage in multi-channel communication since the smaller the limits of time displacement the larger the number of channels possible for a given time interval.

Figure 1:
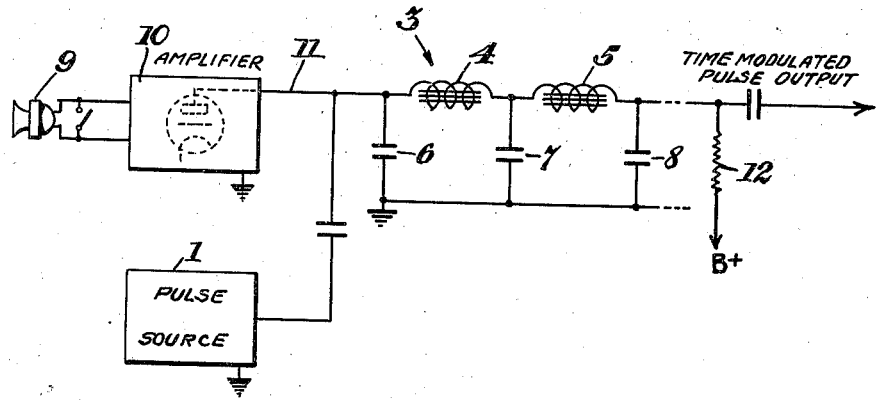
Figure 2:
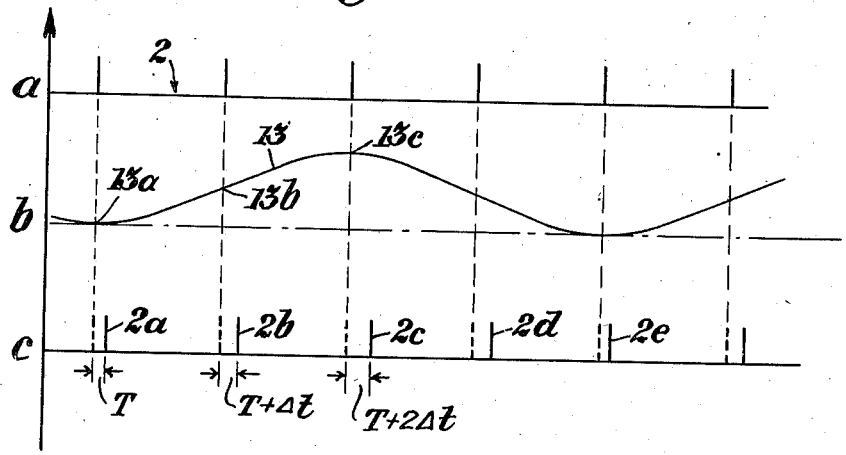
Figure 3:
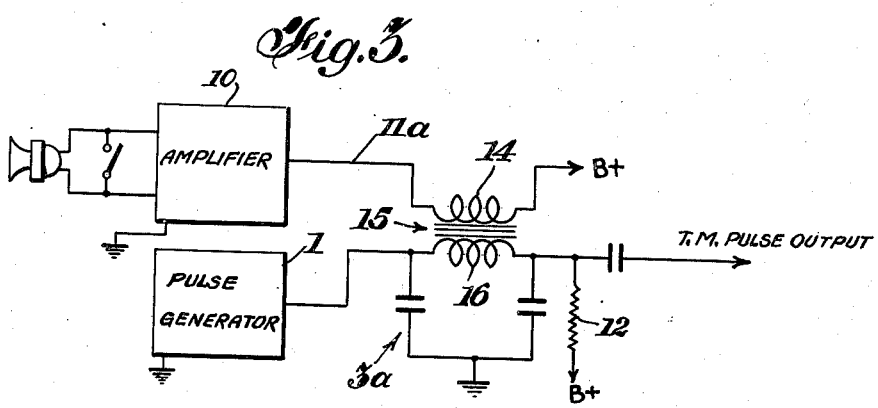
Figure 4:
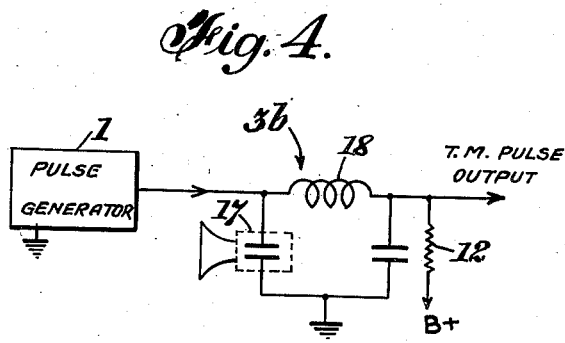

For a further understanding of the invention reference will be had of the following detailed description to be read in connection with the accompanying drawings in which Fig. 1 is a schematic illustration of one form of modulator circuit in accordance with the principles of my invention;

Fig. 2 is a graphical illustration used in explaining the operation of the circuit of Fig. 1; and Figs. 3 and 4 are schematic illustrations of further embodiments of the invention.

Referring to Figs. 1 and 2, the pulse generator 1 may comprise any known form of stable pulse generator whereby a train of equally spaced pulses 2 is produced as shown in graph a. The pulses 2 are applied to a retardation circuit 3 comprising a network of inductance coils 4, 5 etc. and condensers 6, 7, 8 etc. The normal retardation characteristics of the circuit 3 is illustrated with respect to pulse 2a, graph c whereby the pulse is retarded an amount T. In the absence of means for varying the retardation characteristics of circuit 3, the pulses of train 2 will be retarded an equal amount T.

For time modulation of the pulses audio signals from microphone 9 are applied to an amplifier 10, the anode circuit 11 of which includes the coils 4, 5 etc. a source of anode voltage being applied thereto through a resistor 12. This source of anode voltage may also serve the anode circuit of the pulse generator 1.

Graph b of Fig. 2 represents an audio signal 13 of sinusoidal form applied to the control grid of amplifier 10. Point 13a represents the minimum voltage of signal 13 and retardation T may be taken to represent the minimum retardation produced by the circuit 3 for this minimum or zero signal value. The instantaneous signal value at point 13b is greater than the minimum value and therefore produces a greater retardation effect on pulse 2b by a total amount equal to $T+\Delta t$. This greater retardation of pulse 2b over pulse 2a is produced by the change in permeability of the cores of coils 4, 5 etc. thereby altering the inductance of the circuit 3. The still greater signal value represented by point 13c produces a still greater retardation for pulse 2c which occurs at that instant equal to $T+2\Delta t$. As the signal 13 decreases in amplitude the subsequent pulses 2d and 2e are retarded smaller amounts according to the corresponding instantaneous values of the signal wave. It will be understood, of course, that the illustration in Fig. 2 is diagrammatic and is intended to be helpful only to an understanding of the invention.

While I have shown the retardation network 3 in Fig. 1 as comprising a series of inductance coils it should be clearly understood that the number of inductance coils is not of importance since under many circumstances a single inductance coil will provide sufficient time variation in the pulses in accordance with the signal energy applied thereto. In Fig. 3, for example, a further embodiment of the invention is shown where only one inductance coil is used in the retardation circuit. In this case, however, the audio signal from amplifier 10 is applied to the retardation circuit 3a by magnetic coupling. The anode circuit 11a of amplifier 10 includes the coil 14 of a transformer 15 while the other coil 16 of the transformer is used as the inductance coil of the network 3a. The pulses of generator 1 are applied to the circuit 3a, the anode voltage of the generator being supplied through resistor 12 similarly as in the circuit of Fig. 1. This embodiment of the invention requires strong signals in order to change sufficiently the permeability of the iron core of the transformer. It may, therefore, be necessary to provide more than one amplifier stage in amplifier 10. Since the operation of this circuit is similar to the graphical illustration of Fig. 2 hereinafter described, no further explanation is believed necessary.

In Fig. 4 a still further embodiment of the invention is shown wherein one of the condensers of the retardation circuit 3b is employed as a condenser microphone 17. The pulses of pulse generator 1 are applied to the retardation circuit 3b in the manner hereinbefore described, and sound signals applied to the microphone 17 vary the capacitance of circuit 3b, thereby time modulating the pulses produced by generator 1. The inductance coil 18 of the circuit 3b need not have an iron core as required in the embodiment of Figs. 1 and 3.

While I have shown and described particular forms and variations of the modulator of my invention it should be understood that the forms herein shown and described are given by way of illustration of the invention only and not as restricting the invention as set forth in the object and the appending claims.

I claim:

1. A pulse time modulator, a source of signal energy, a retardation circuit including an inductance, means for applying a train of discrete pulses to said retardation circuit, and means for varying the inductance of said circuit according to the instantaneous values of said signal source.

2. A modulator according to claim 1, wherein said inductance has a core of variable permeability and said means for varying the inductance comprises means for varying said permeability.

3. A modulator according to claim 1, wherein means are provided for applying the pulses and the signals in parallel to said retardation circuit.

4. A modulator according to claim 1, wherein said inductance comprises a transformer having a variable permeability core with the signals applied to one side of the transformer and the discrete pulses to the other side thereof.

EMILE LABIN.

REFERENCES CITED

The following references are of record in the file of this patent:

UNITED STATES PATENTS

| Number | Name | Date |
| --- | --- | --- |
| 2,085,418 | Crosby | June 29, 1937 |
| 2,100,156 | Bushbeck | Nov. 23, 1937 |
| 2,160,466 | Usselman | May 30, 1939 |
| 2,259,392 | Roberts | Oct. 14, 1941 |
| 2,289,564 | Wrathall | July 14, 1942 |